US006994881B2

(12) United States Patent
Colamussi

(10) Patent No.: US 6,994,881 B2
(45) Date of Patent: Feb. 7, 2006

(54) DEVICE FOR THE FORMATION OF CROISSANTS MADE OF PUFF PASTRY OR THE LIKE

(75) Inventor: Arturo Colamussi, Ferrara (IT)

(73) Assignee: Vortex Systems S.r.l., Fossalta-Ferrara (IT)

( * ) Notice: Subject to any disclaimer, the term of this patent is extended or adjusted under 35 U.S.C. 154(b) by 274 days.

(21) Appl. No.: 10/189,289

(22) Filed: Jul. 3, 2002

(65) Prior Publication Data

US 2003/0019369 A1    Jan. 30, 2003

(30) Foreign Application Priority Data

Jul. 6, 2001    (IT) .................... MI2001A1447

(51) Int. Cl.
B29C 53/00    (2006.01)
B29D 3/00    (2006.01)

(52) U.S. Cl. .................... 426/496; 426/297; 426/500; 426/512; 425/383; 425/139; 425/388; 99/450.2

(58) Field of Classification Search ................ 426/297, 426/496, 500, 512; 99/450.2; 425/383, 425/139; B29C 53/00, 3/00; B29D 3/00

See application file for complete search history.

(56) References Cited

U.S. PATENT DOCUMENTS

| 3,495,722 A | | 2/1970 | Schroder | |
|---|---|---|---|---|
| 4,431,396 A | * | 2/1984 | Lee | 425/383 |
| 4,515,819 A | * | 5/1985 | Shinriki | 426/297 |
| 4,582,472 A | * | 4/1986 | Hanson | 425/139 |
| 5,009,910 A | * | 4/1991 | Zwicker | 426/499 |
| 5,012,726 A | * | 5/1991 | Fehr et al. | 99/450.6 |
| 5,143,735 A | * | 9/1992 | Varvello et al. | 425/220 |

(Continued)

FOREIGN PATENT DOCUMENTS

EP    0 490 190 A1    6/1992

(Continued)

OTHER PUBLICATIONS

EP Search Report.

Primary Examiner—Robert Davis
Assistant Examiner—G. Nagesh Rao
(74) Attorney, Agent, or Firm—Hedman & Costigan, P.C.

(57) ABSTRACT

A device for the formation of croissants made of puff pastry or the like, said croissants being initially shaped into pastry rolls (12) starting from flat puff pastry, wherein there are at least two gripping or clasping and folding elements (13, 14, 15), connected by an articulated joint (16, 17) and suitable for being transferred, aligned with each other, onto portions of a puff pastry roll (12), withholding the roll (12) and being moved to a folded position thus causing the firmly held pastry roll to take on the form of a U- or crescent shape, there also being driving systems (25, 26) for the reciprocal movement between the at least two gripping or clasping and folding elements (13, 14, 15). The invention also relates to a process for the formation of croissants made of puff pastry or the like, wherein each croissant, in the form of a cylindrical pastry roll, is gripped by at least two jointed gripping and folding elements (13, 14, 15), maintained in a firm position and folded to form a U- or crescent shape by moving the two gripping or clasping and folding elements, before being released in a folded position.

4 Claims, 4 Drawing Sheets

U.S. PATENT DOCUMENTS

| | | | |
|---|---|---|---|
| 5,301,847 A * | 4/1994 | Fehr et al. | 222/309 |
| 5,756,138 A * | 5/1998 | Milohanic | 426/231 |
| 6,165,527 A * | 12/2000 | Wilk et al. | 426/279 |
| 6,622,617 B1 * | 9/2003 | Colamussi | 99/450.2 |
| 6,838,105 B2 * | 1/2005 | Finkowski et al. | 426/496 |

FOREIGN PATENT DOCUMENTS

| | | |
|---|---|---|
| EP | 0 571 089 A1 | 11/1993 |
| FR | 2 558 339 | 7/1985 |
| NL | 9201125 A * | 1/1994 |

* cited by examiner

DEVICE FOR THE FORMATION OF CROISSANTS MADE OF PUFF PASTRY OR THE LIKE

The present invention relates to a device for the formation of croissants made of puff pastry or the like.

The term "croissant" defines a food product which is normally eaten for breakfast. This product is "crescent" shaped and the shape is currently formed manually.

At present, the production process of this food product can be summarized as follows.

Puff pastry is made and cut into triangles which are rolled up; all of this is effected on a machine which operates on several lines to obtain a commercially valid and sufficient production capacity. During the rolling phase, the machine can also deposit cream, jam or other similar products to provide a filling for the croissant.

When the pastry has been rolled up, the croissants fall onto a collection belt from which they are removed by the operators, folded and replaced onto the belt or onto a different belt or onto baking trays which may or may not have specific cavities.

It should firstly be noted that the croissants, thus rolled up, do not fall simultaneously and can also be moved from the axis of their operating line.

In order to improve production and not limit the potentiality as a result of the manual folding operations, attempts at mechanized folding have been made, but due to the various problems which have arisen, no useful system has been obtained.

An objective of the present invention is to create a device or machine which is capable of solving the above problems.

Another objective is to be able to start from the removal of rolled croissants, coming from a rolling machine, and fold them into a U- or crescent shape, without any manual intervention, before depositing them on a work surface which can vary each time.

These objectives according to the present invention are achieved by means of a device for the formation of croissants made of puff pastry or the like, as described in claim 1.

Further characteristics and specific details of the device of the present invention are also illustrated in the subsequent claims.

Figure 1:
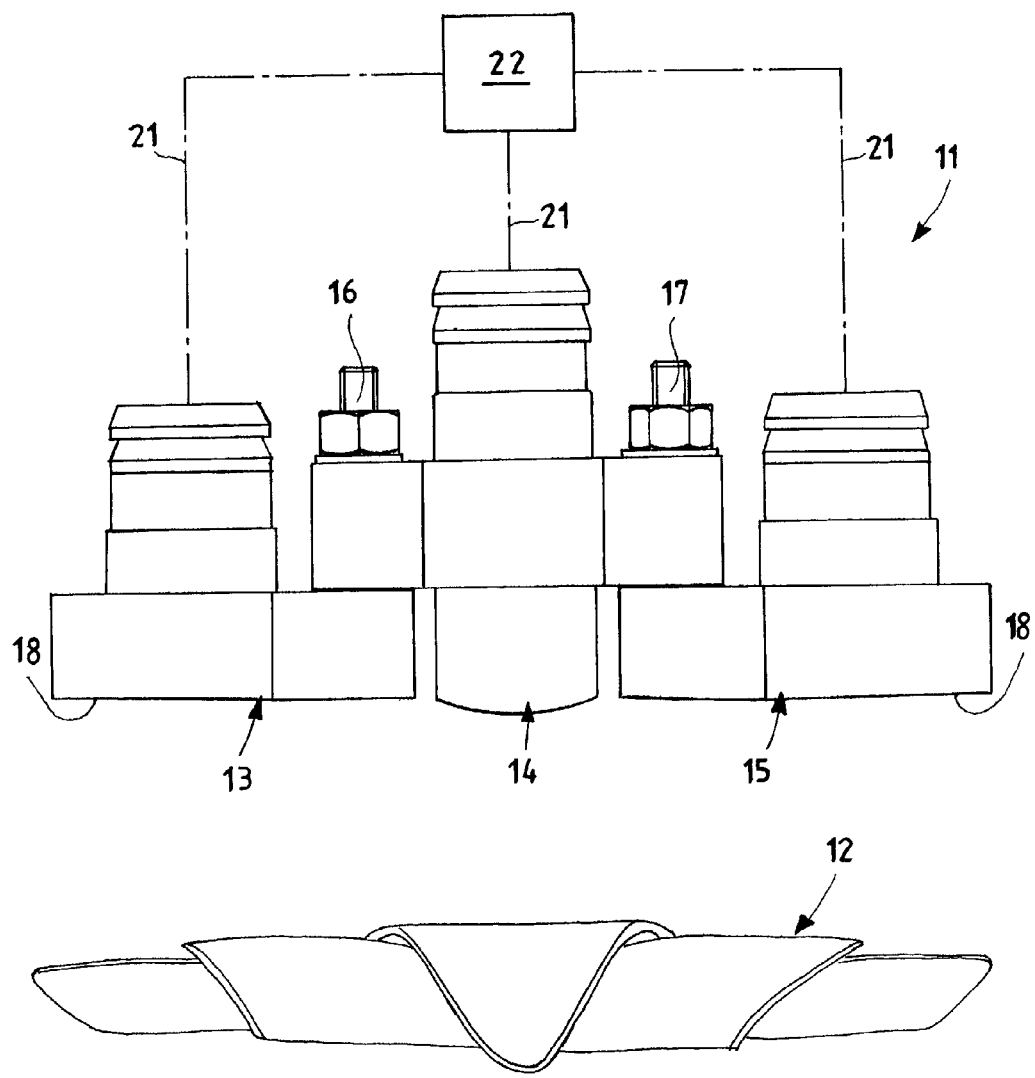
Figure 2:
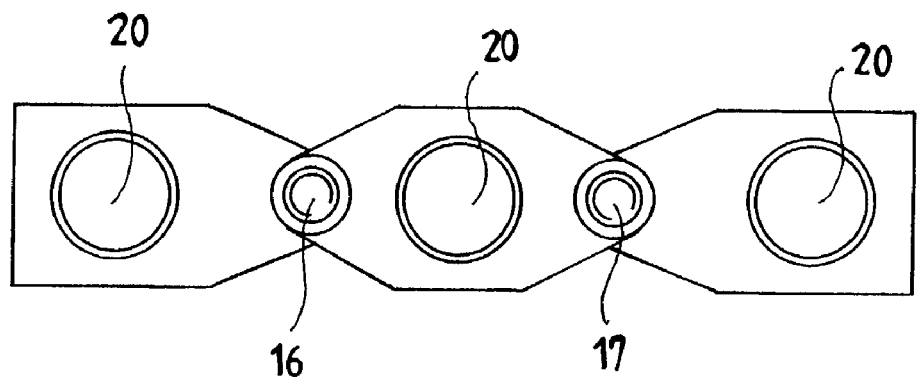
Figure 3:
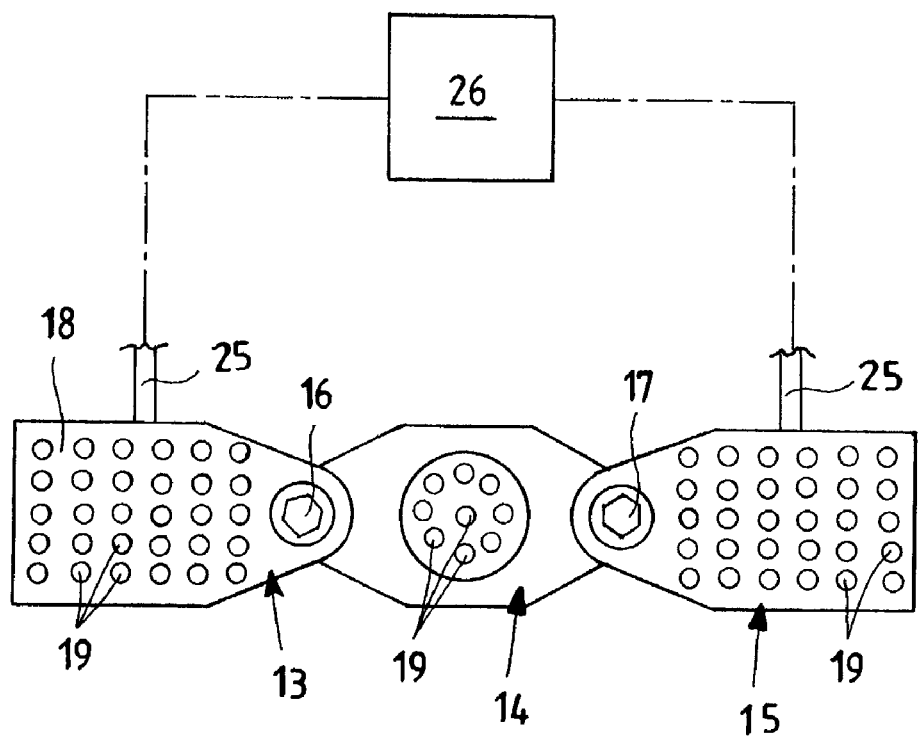
Figure 4:
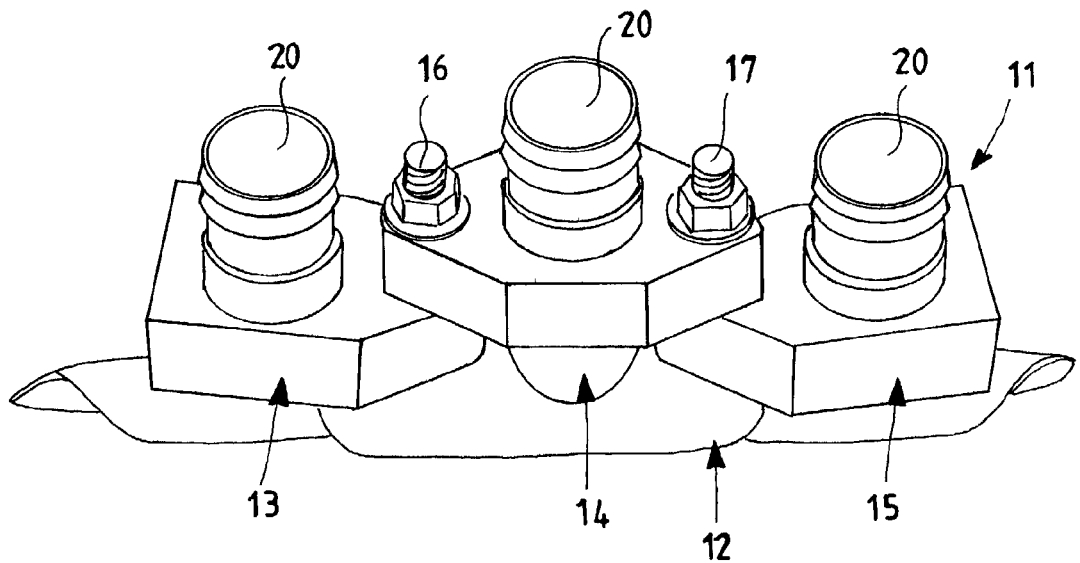
Figure 5:
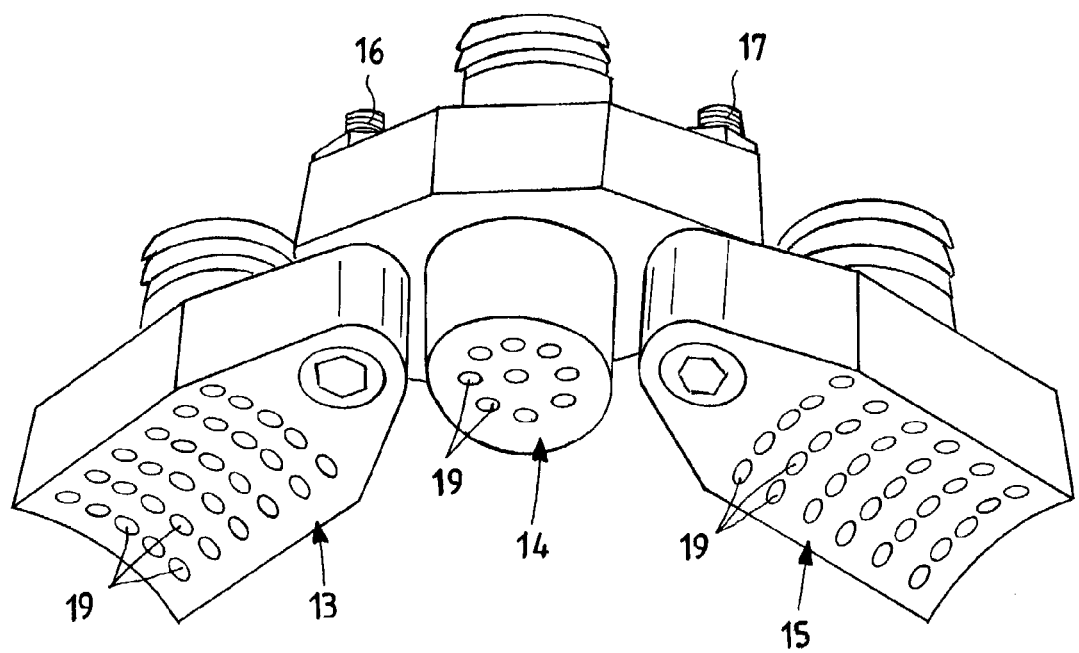
Figure 6:
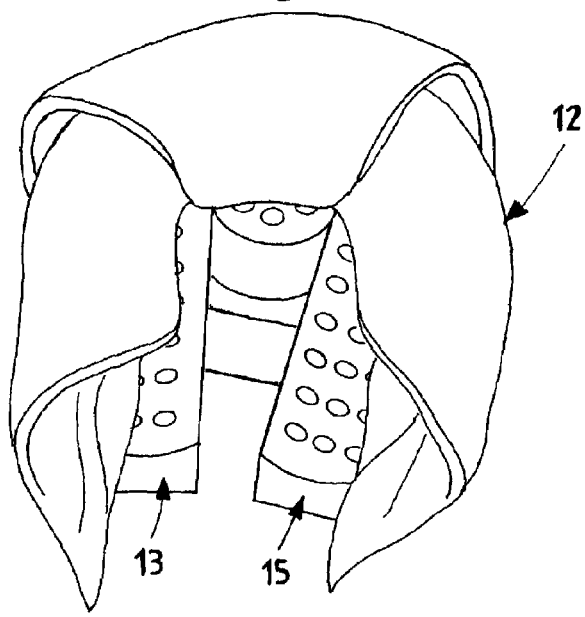
Figure 7:
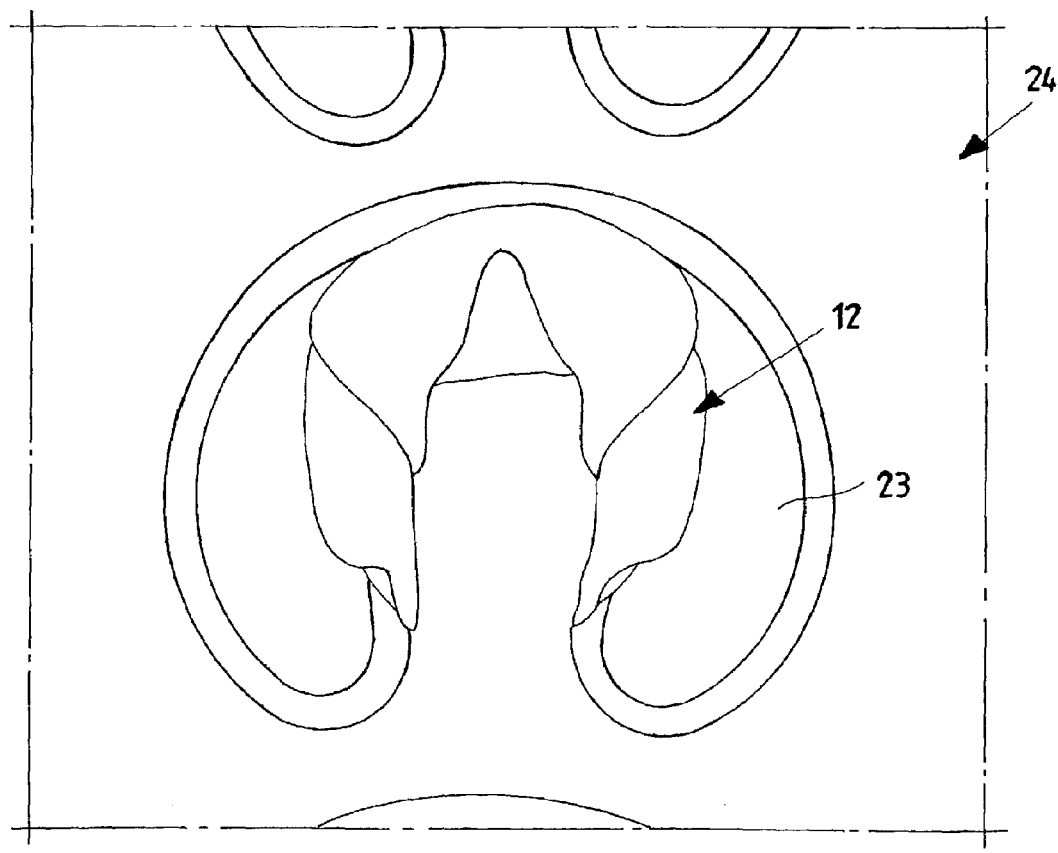

The characteristics and advantages of a device for the formation of croissants made of puff pastry or the like, according to the present invention will appear more evident from the following illustrative and non-limiting description, referring to the enclosed schematic drawings wherein:

FIG. 1 is a raised side view of a single device for the formation of a croissant made of puff pastry or the like, in the gripping position of a puff pastry roll, with a roll at a distance therefrom, ready to be gripped, together with the relative connections to the device, FIG. 2 is a plan view from above of the device of FIG. 1, FIG. 3 is a plan view from below of the device of FIG. 1 schematizing the movement units of the device, FIG. 4 illustrates a perspective view of the device of FIG. 1 once put in contact with and gripping the pastry roll, FIG. 5 shows a perspective view from below of the device of FIG. 1 with rotated arms, FIG. 6 illustrates a plan view from below of the device of FIG. 1, in contact with and gripping a roll, rotated at an angle of about 90° preparing the pastry for its final shape, FIG. 7 is a plan view from above of the folded pastry housed in a cavity of a baking tin, partially illustrated.

With reference to the figures, a device is shown for the formation of croissants made of puff pastry or the like, indicated with 11, which is positioned above a puff pastry roll 12 previously rolled starting from a triangle-shaped piece of pastry, not shown.

The device comprises gripping or clasping and folding elements capable of being positioned and acting on the puff pastry roll 12.

In the example illustrated, the gripping or clasping and folding elements consist of a combination of three box-like elements 13, 14 and 15, having small dimensions, connected by two hinges 16 and 17. The two hinges 16 and 17 can consist of pivots or any other connecting element which provides an adequate articulated joint. The three box elements 13, 14 and 15 are in line with each other and comprise two external elements 13, 15 at the ends and an internal central connecting element 14 between the two external elements which allows them to rotate with respect to the internal element.

Each of these box elements has a curved lower wall 18, with a cylindrical/conical shape, fitting into the rounded form of the roll 12 which forms the straight rolled croissant. Furthermore each lower wall 18 is equipped with large number of holes 19.

Each box element 13, 14 and 15, is connected by means of an upper opening 20, for example connected to a pipe schematized in 21, to a vacuum generating group, schematized in 22 in order to effect suction on the pastry roll 12.

The three box elements 13, 14 and 15 in the rest position of the device are completely in line with each other enabling them to be housed on the straight roll which will form the puff pastry croissant. FIG. 3 schematizes in 25 two levers which can be used for automatically moving the box elements 13 and 15 of the device when driven by a lever system, not shown, in turn driven by one or more actuators 26, associated with one or more of these devices 11. The device or devices according to the invention will naturally be carried by a robot or similar system, installed downstream of the rolling devices and will collaborates with these.

In this position, the roll 12 is gripped or grasped by means of suction due to the connection and activation of the vacuum generating group 22 so that the lower curved walls 18 of the three box elements 13, 14 and 15 block the upper lateral surface of the puff pastry roll 12, holding it firmly. For this purpose there is also a certain pressure on the roll so as to bring all the suction holes 19 in contact with the surface of the puff pastry.

At this stage, the pastry roll 12 is lifted and the two external box elements 13 and 15 are rotated by about 90° or more with respect to the central box element 14 so as to deform the pastry roll into a final U- or crescent shape of the croissant.

The puff pastry roll 12 thus lifted and treated has its final shape as a croissant and is ready to be leavened and baked in accordance with the procedure normally adopted.

For this purpose, the roll 12, thus folded, is pressed on a depositing surface 23, which can consist of a tin 24, or a conveyor belt (not shown), of various kinds.

During this depositing phase, a certain pressure is exerted so that the roll 12, thus folded and shaped to form a croissant, is completely in contact with the rest and depositing surface 23. This is useful to help preserve the folding during the subsequent pastry processing phases, which generally consist of rising and baking.

For a correct release in this position, the air pressure inside the box elements 13, 14 and 15 is rapidly raised to positive values so that a stream of air is established through the holes 19. This stream of air has the double purpose of detaching the croissant pastry roll 12 and removing any possible pastry residues which have penetrated the holes 19 during the previous suction phase.

It should be noted that the croissant pastry roll 12, due to the presence of the vacuum holes and previous suction, has a series of small surface bubbles which disappear however in the rising phase; in this way the product is entirely similar to that obtained with the manual folding operation.

This would not be the case if needles were used as gripping elements or perforation grasping elements, as already attempted, as these provide an insecure grip and it has also been observed that the surface of the product, after leavening and baking, has very distinct markings and the product is therefore commercially unacceptable.

The device described is naturally one of the possible embodiments but there are also other alternatives. For example, the gripping or clasping and folding elements consisting of box-like elements may also not include the central element 14, the two lateral arm-shaped elements being sufficient to grip and fold the straight roll into the final U- or crescent shape required.

What is claimed is:

1. A device for the formation of croissants made of puff pastry or the like, said croissants being initially shaped into pastry rolls (12) starting from flat puff pastry, characterized in that there are at least two gripping or clasping and folding elements (13, 15), connected by an articulated joint (16, 17) and suitable for being transferred, aligned with each other, onto upper lateral portions of a puff pastry roll (12), lifting the roll (12) and being moved to a folded position thus causing the firmly held pasty roll to take on the form of a U- or crescent shape, there also being driving systems (25, 26) for the reciprocal movement between the at least two gripping or clasping and folding elements (13, 15) wherein said at least two gripping or clasping and folding elements (13, 15) have hollow suction portions (18, 19) connected to vacuum suction units (22) and said suction portions are box-shaped and comprise a lower curved wall (18) having at least two suction holes (19) which suction said roll into contact with said lower curved wall.

2. The device according to claim 1, characterized in that between said two gripping or clasping and folding elements (13, 15) there is a gripping element (14) to which said two gripping or clasping and folding elements (13, 15) are connected with said articulated joint (16, 17).

3. The device according to claim 2, characterized in that said gripping element (14) also has hollow suction portions (18, 19).

4. The device according to claim 1, characterized in that said lifting of the roll is in a vertical direction perpendicular to the surface supporting said roll.

* * * * *